United States Patent [19]
Wiklof et al.

[11] Patent Number: 6,147,604
[45] Date of Patent: Nov. 14, 2000

[54] WIRELESS MEMORY DEVICE

[75] Inventors: Christopher A. Wiklof, Everett; Steven C. Hugh, Bothell; Pixie Ann Austin, Marysville, all of Wash.

[73] Assignee: Intermec IP Corporation, Beverly Hills, Calif.

[21] Appl. No.: 09/173,539

[22] Filed: Oct. 15, 1998

[51] Int. Cl.[7] .................................................. G08B 13/14
[52] U.S. Cl. ........................ 340/572.1; 235/487; 343/878
[58] Field of Search ............................. 340/572.1, 572.8; 235/487, 492; 428/156, 158, 159, 160, 343, 542.8, 901; 257/729; 343/878

[56] References Cited

U.S. PATENT DOCUMENTS

| | | | |
|---|---|---|---|
| 3,299,424 | 1/1967 | Vinding | 343/6.5 |
| 3,852,755 | 12/1974 | Works et al. | 343/701 |
| 4,075,632 | 2/1978 | Baldwin et al. | 343/6.8 R |
| 4,700,179 | 10/1987 | Fancher | 340/572 |
| 4,816,839 | 3/1989 | Landt | 343/795 |
| 4,827,395 | 5/1989 | Anders et al. | 364/138 |
| 4,853,705 | 8/1989 | Landt | 343/803 |
| 4,961,105 | 10/1990 | Yamamoto | 257/679 |
| 5,075,691 | 12/1991 | Garay et al. | 343/830 |
| 5,142,292 | 8/1992 | Chang | 343/742 |
| 5,430,441 | 7/1995 | Bickley et al. | 340/825.54 |
| 5,448,110 | 9/1995 | Tuttle et al. | 257/723 |
| 5,528,222 | 6/1996 | Moskowitz et al. | 340/572 |
| 5,538,803 | 7/1996 | Gambino et al. | 428/694 TM |
| 5,552,778 | 9/1996 | Schrott et al. | 340/825.34 |
| 5,554,974 | 9/1996 | Brady et al. | 340/572 |
| 5,565,847 | 10/1996 | Gambino et al. | 340/572 |
| 5,566,441 | 10/1996 | Marsh et al. | 29/600 |
| 5,600,175 | 2/1997 | Orthmann | 257/532 |
| 5,682,143 | 10/1997 | Brady et al. | 340/572 |
| 5,729,201 | 3/1998 | Jahnes et al. | 340/572 |
| 5,736,929 | 4/1998 | Schrott et al. | 340/572 |
| 5,767,772 | 6/1998 | Lemaire et al. | 340/571 |
| 5,812,065 | 9/1998 | Schrott et al. | 340/825.54 |
| 5,912,622 | 6/1999 | Endo et al. | 340/572.5 |
| 5,939,984 | 8/1999 | Brady et al. | 340/572.1 |
| 6,002,343 | 12/1999 | Auerbach et al. | 340/10.1 |

FOREIGN PATENT DOCUMENTS

| | | |
|---|---|---|
| 0 231 937 A2 | 8/1987 | European Pat. Off. . |
| 0 231 937 B1 | 8/1987 | European Pat. Off. . |
| 0 595 549 A2 | 5/1994 | European Pat. Off. . |

*Primary Examiner*—Thomas Mullen
*Attorney, Agent, or Firm*—Perkins Coie LLP

[57] ABSTRACT

A memory device comprises a substrate, an antenna on a first surface of the substrate, a microelectronic structure coupled to the antenna, a selectively deformable intermediate layer covering the first surface, the antenna and the microelectronic structure and conforming thereto, and an adhesive layer covering the intermediate layer. The intermediate layer may be deformable for selectively positioning the antenna with respect to the adhesive, and positioning the antenna with respect to an item to which the memory device is secured. The intermediate layer may be compressed, creating a relatively low profile for printing on the memory device. The intermediate layer may be an elastomerically compressible material, such as foam, or may be a selectively pressurizable and deformable envelope. A substantially planar surface of the intermediate layer provides a smooth surface for further manufacturing steps such as forming a protective film layer, a conductive ground layer, or for depositing adhesive and die cutting the RF tag onto a release liner. A face sheet may be positioned on the second surface of the substrate to provide a smooth surface for printing. Alternatively, the intermediate layer may provide a substantially planar surface for the face sheet. The ground layer may be formed from a spent transfer ribbon. A second ground layer and a dielectric layer may form a capacitor.

35 Claims, 8 Drawing Sheets

WIRELESS MEMORY DEVICE

TECHNICAL FIELD

This invention relates to wireless memory devices, for example, radio frequency memory tags.

BACKGROUND OF THE INVENTION

Memory devices for storing and retrieving data are known in the art. For example, radio frequency ("RF") tags are available from a number of manufacturers, including Texas Instruments of Dallas, Tex. and Omron of Japan. The manufacturing of memory tags such as RF tags typically includes laminating a circuit substrate between a face sheet and a release liner.

The circuit substrate generally carries an electronic structure such as an integrated circuit, and electrical connections such as traces and pads. For RF tag memory devices, an antenna is coupled to one or more pads of the circuit substrate. The electronic structure typically includes a memory portion and a logic portion. The logic portion controls the reading, writing, or manipulating of data in the memory portion. The logic portion further couples the memory portion to the antenna to form a transmitter, receiver, or transceiver for reading or writing data to or from the RF tag. Thus, for example, an RF tag may receive and transmit RF signals to write data to the memory and to read data from the memory.

The face sheet provides a protective layer over one surface of the circuit substrate, thereby protecting the antenna and the electronic structure. A pressure sensitive adhesive may cover a second surface of the circuit substrate to readily affix the memory device to an item or container. The release liner provides a selectively removable protective layer over the pressure sensitive adhesive, which a user removes before applying the memory tag to an item or container.

The existing laminate structures and methods of manufacturing memory tags present certain problems. Due to the typically thin profile of most memory tags, the antenna is usually positioned extremely close to the item or container to which the memory device is affixed. This antenna placement unfavorably interferes with good communications with the memory device, especially when the underlying container is made of metal. This antenna placement also reduces the overall range of the memory device.

While it is possible to build a relatively high profile memory device that spaces the antenna further away from the package or item than current memory devices, such a high profile device leads to other problems. For example, memory devices such as RF tags may carry printed indicia on a visible surface of the RF tag. The indicia may be printed on the RF tag by the end-user, after the device has been manufactured. Printing on a relatively high profile device would be extremely difficult and would require specialized equipment, if possible at all. Another problem in current memory device structures is that the integrated circuit and other electronic structures typically produce a non-flat surface and thus a discontinuity in the surface of the face sheet, significantly interfering with printing on the face sheet. Such printing interference necessarily lowers print quality. The discontinuity may also interfere with manufacturing operations after forming or placing the electronic structures on the circuit substrate.

SUMMARY OF THE INVENTION

Under one aspect of the invention, a memory device comprises a substrate, an antenna formed on a first surface of the substrate, an electronic structure carried by the substrate and coupled to the antenna, a selectively deformable intermediate layer covering the first surface, the antenna and the electronic structure, and an adhesive layer covering the intermediate layer. The intermediate layer is deformable for selectively positioning the antenna with respect to the adhesive layer, and thereby positioning the antenna with respect to an item or container to which the memory device is secured. The intermediate layer may be compressed, creating a relatively low profile for permitting printing on the memory device. In use, the intermediate layer may be in an uncompressed state, thereby spacing the antenna relatively from the adhesive layer and consequently spacing the antenna from the item or package to which the memory device is secured.

The intermediate layer may take the form of a foam material, such as a slow recovery polyurethane foam. Alternatively, the intermediate layer may take the form of a selectively pressurizable and deformable envelope. The pressure within the envelope relative to a pressure outside the envelope may be selectively varied by a number of means, such as, in situ chemical reaction, a reaction triggered by electromagnetic energy, and the introduction of fluid into the envelope through an inlet valve. The envelope may have a deformable meniscus, and may be formed of an elastomeric material.

The intermediate layer generally conforms to the first surface of the substrate, the antenna and the microelectronic structure, while providing a substantially planar surface opposed to the first surface of the substrate. The substantially planar surface of the intermediate layer provides a smooth and continuous surface for further manufacturing operations such as forming a protective film layer, a conductive ground layer, or for depositing adhesive, laminating the memory device onto a release liner and die-cutting the memory device. Further, a face sheet may be positioned on the second surface of the substrate to provide a smooth continuous surface for printing.

The memory device may further include a protective film layer and a conductive ground layer disposed between the adhesive layer and the substrate. The ground layer may or may not extend through the adhesive layer for making contact with a conducting material to which the RF tag is secured. The memory device may further include a second ground layer, separated from the first ground layer by a dielectric to form a capacitve device to store electrical energy.

In another aspect of the invention, the face sheet may extend over an edge of the intermediate layer providing a protective enclosure for the memory device. The face sheet may extend to the film layer and may be attached to the film layer to form a sealed enclosure. Further, the electronic structure may include a protective encapsulation.

In another aspect of the invention, a method of forming a memory device comprises supplying a substrate, forming an antenna on the substrate, locating an electrical circuit on the substrate coupled to the antenna, forming an intermediate layer on the substrate, and covering the antenna and the electrical circuit such that the intermediate layer conforms to the antenna and the electrical circuit and presents a substantially planar surface opposed to the substrate. The method may further include depositing an adhesive layer over the substantially planar surface of the intermediate layer, for example by laminating the memory device onto a release liner and die-cutting as desired. The method may further include forming a protective film layer, and, or, forming a ground plane of conductive material.

In yet another aspect of the invention, a method of using a memory device may comprise printing on the memory device and selectively expanding the memory device to move an antenna from a first position proximate an adhesive layer to a second position spaced relatively away from the adhesive layer with respect to the first position after printing on the memory device. The method may further include removing a release liner from the memory device to expose an adhesive layer and applying the memory device to an item or container by contacting the item with the adhesive layer.

In a further aspect of the invention, a spent transfer ribbon may be recycled to create a ground plane. Metal or conductive material remaining on the transfer ribbon after forming conductive traces may be transferred to form the ground plane. Alternatively, the spent transfer ribbon may be laminated into the memory device to form the ground plane.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with integrated circuits, antennas, radio frequency transmitters and receivers, and machine-readable symbologies have not been shown or described in detail to avoid unnecessarily obscuring the description of the embodiments of the invention.

Figure 1:
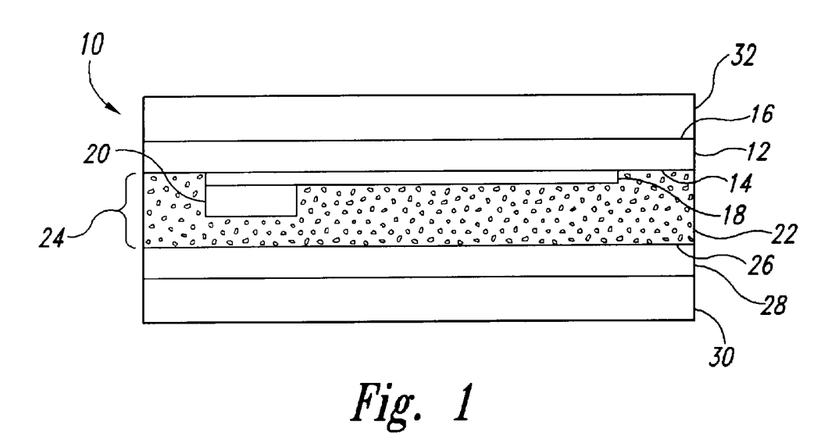
FIG. 1 is a cross-sectional view taken along section line 1—1 of FIG. 4 of a first exemplary embodiment of a memory device having a deformable intermediate layer in a compressed state.

FIG. 1 shows a wireless memory device in the form of a radio frequency ("RF") tag 10. The RF tag 10 includes a substrate 12, preferably of a flexible sheet type material having very low conductivity (e.g., sheet plastic) and preferably heat-resistant. Examples of suitable materials include polymide, poly-ether-ether-ketone, FR4 and other known dielectric substrates. The substrate 10 includes a first surface 14 and a second surface 16 opposed to the first surface 14. An antenna 18 is formed on the first surface 14 of the substrate 12. The antenna 18 may consist of any electrically conductive material, for example, aluminum or copper.

The RF tag 10 includes an electronic structure such as an integrated circuit 20 that couples to the antenna 18. The integrated circuit 20 includes a memory portion in the form of memory circuits and a logic portion in the form of logic circuits for storing, retrieving, and manipulating data in the memory portion. The antenna 20 permits the logic circuit to receive and transmit data externally from the RF tag 10 via RF signals. The integrated circuit 20 may further include power circuitry for generating power from an RF field, as is conventionally known in the art. Alternatively, the RF tag 10 may include a discrete power source, such as a battery (not shown).

The RF tag 10 includes an intermediate layer 22 having a thickness 24 that is selectively adjustable. The intermediate layer 22 covers the first surface 14 of the substrate 12, the antenna 18 and the integrated circuit 20. The intermediate layer 22 may conformingly engage the first surface 14, antenna 18, and integrated circuit 20 to accommodate the space occupied by these devices, while providing a substantially smooth, continuous and planar surface 26 opposed to the first surface 14 of the substrate 12.

A variety of methods and materials may be suitable for forming the intermediate layer 22 such that an adhesive layer 28 may be selectively spaced from the substrate 12 or the antenna 18. For example, a layer formed of a compressed or a compressible elastomer may prove suitable, elastomers being deformably compressible to vary the dimensions of the material. Alternatively, a deformable bladder or envelope may be employed, as explained in detail below.

The intermediate layer 22 may comprise a material having distinctive compliant and rigid states. For example, the intermediate layer 22 may comprise a cellulose material that expands from a compressed state when exposed to water or humidity or some other substance. The cellulose material may be pre-cut or formed to conform to the underlying structure before being positioned on the substrate 12. Where the material is pre-cut, gaps or spaces may exist between the material and the underlying structure. Materials that involve a two-part in situ reaction may also prove suitable.

Alternatively, the intermediate layer 22 may comprise a material that remains complaint over the life of the RF tag 10. For example, the intermediate layer 22 may comprise an elastomer such as a resilient open or closed cell foam material. Suitable foam materials may include urethane, polyester, polyether, latex, polyethylene, silicone, urethane ethers, polypropylene, neoprene and poly-vinyl chloride. The material may rely on out-gassing to expand the thickness 24 of the intermediate layer 22.

A slow recovery foam is preferred for the intermediate layer 22, such as a slow recovery polyurethane foam available from Argus Corporation of Newark, Del. As implied by the name, slow recovery foams slowly return to their undeformed state after being compressed. The foam may be selected to provide a sufficiently long recovery period to permit printing and other manufacturing steps to occur while the intermediate layer 22 is in its compressed state.

Figure 6:
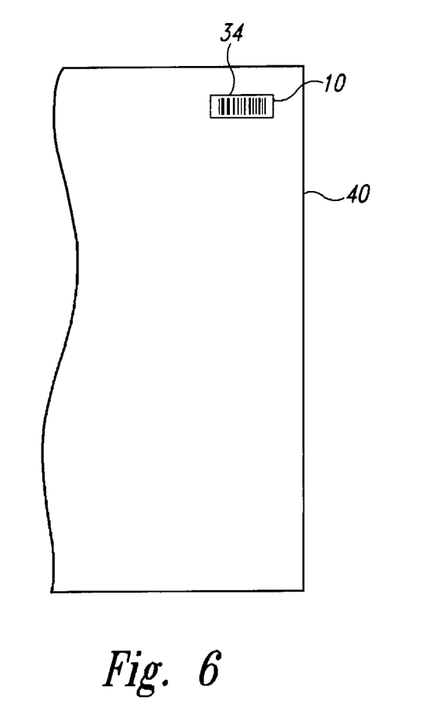
FIG. 6 is a partially broken front elevational view of a container carrying a memory device.
Figure 7:
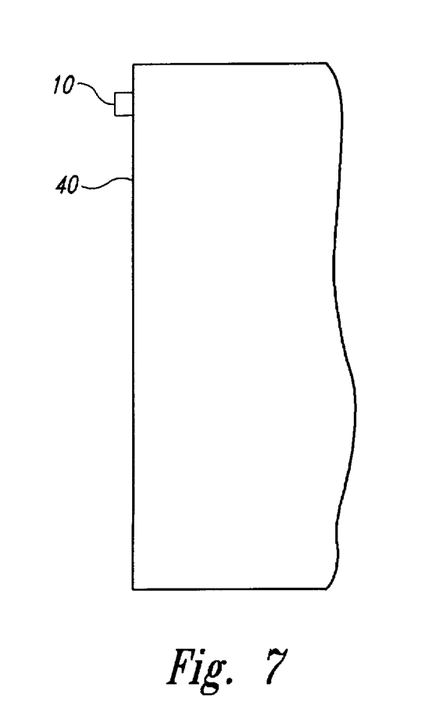
FIG. 7 is a right side elevational view of the container and memory device of FIG. 6.

The selectively exposable adhesive layer 28 covers the substantially planar surface 26 of the intermediate layer 22. The adhesive layer 28 may comprise a pressure sensitive adhesive for allowing the RF tag 10 to be easily secured to an item or container 40 (FIGS. 6 and 7). The RF tag 10 further includes a release liner 30 overlying the pressure sensitive adhesive 28. The release liner 30 is selectively removable by a user for exposing the adhesive layer 28 before applying the memory device to an item or package 40 (FIGS. 6 and 7).

The RF tag 10 further includes a face sheet 32 covering the second surface 16 of the substrate 12. The face sheet 32 provides a smooth continuous surface for printing. The face sheet 32 may, for example, be any suitable tag or card stock.

Figure 2:
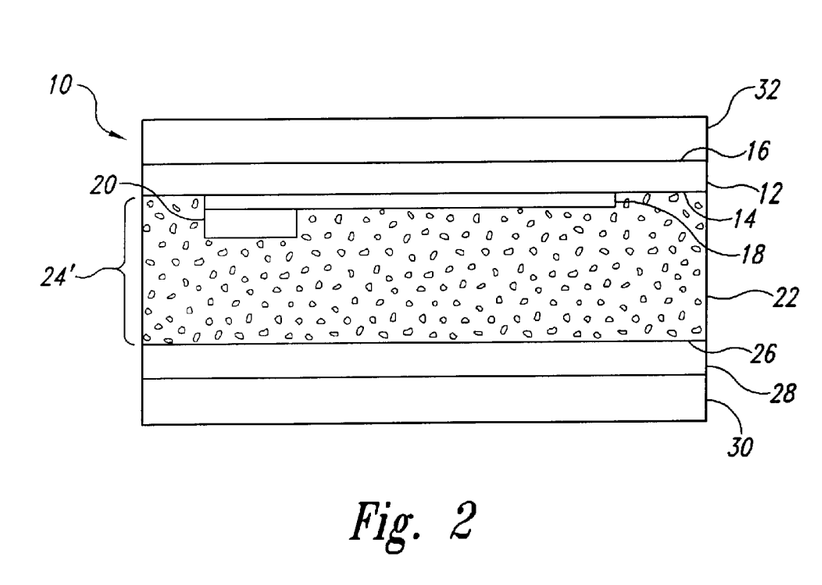
FIG. 2 is a cross-sectional view of the memory device of FIG. 1 in which the intermediate layer is in an expanded or uncompressed state.

FIG. 2 shows the RF tag 10 in an expanded or uncompressed state.

The thickness 24' of the intermediate layer 22 has been selectively increased such that the adhesive layer 28 is spaced relatively away from the antenna 18 with respect to the position of the adhesive layer 28 in the compressed form shown in FIG. 1. As discussed in detail below, the intermediate layer 22 may take the form of a slow recovery foam, that slowly returns to the uncompressed after being compressed. One skilled in the art will note that the adhesive layer 28 is typically adjacent the item, package, or other substrate 40 (FIGS. 6 and 7) to which the RF tag 10 is affixed, and spacing the antenna 18 away from the adhesive layer 28 consequently spaces the antenna 18 away from the item, package, or other substrate 40 to which the RF tag 10 is fixed. Spacing the antenna 18 away from the item, package, or other substrate 40 may significantly improve the performance of the antenna and may reduce communications interference.

Figure 3:
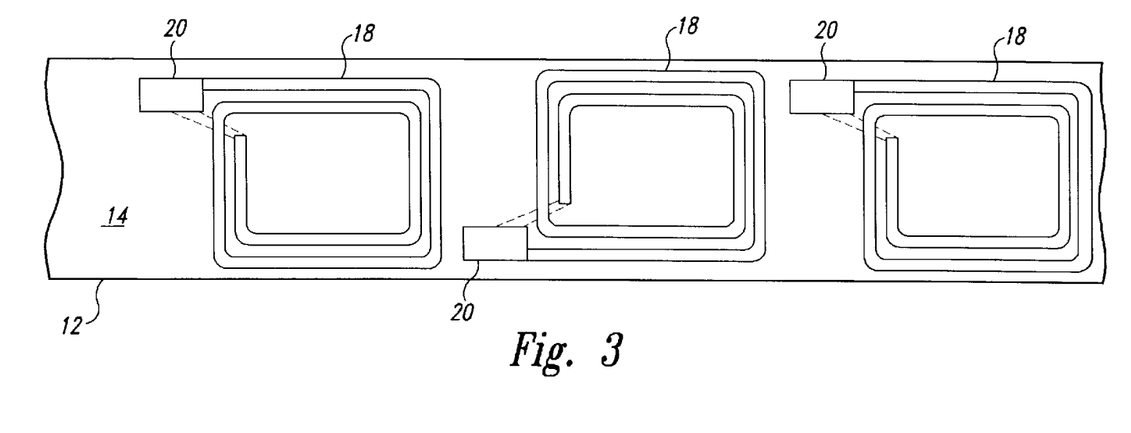
FIG. 3 is a bottom plan view of a number of memory devices at an intermediate stage of manufacture, having antennas and microelectronic structures formed thereon.
Figure 4:
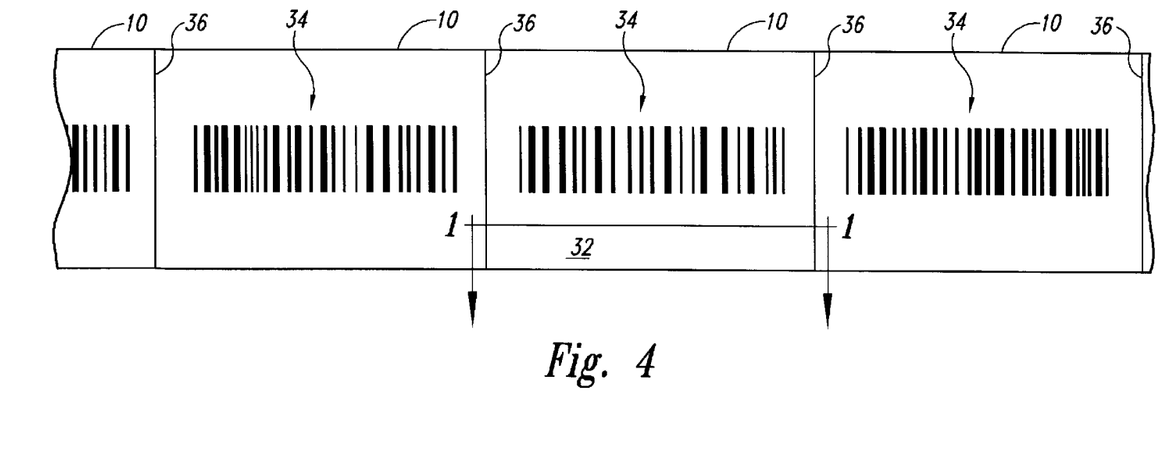
FIG. 4 is a top plan view of a number of memory devices, each having a respective machine-readable symbol printed on a visible surface thereof.
Figure 5:
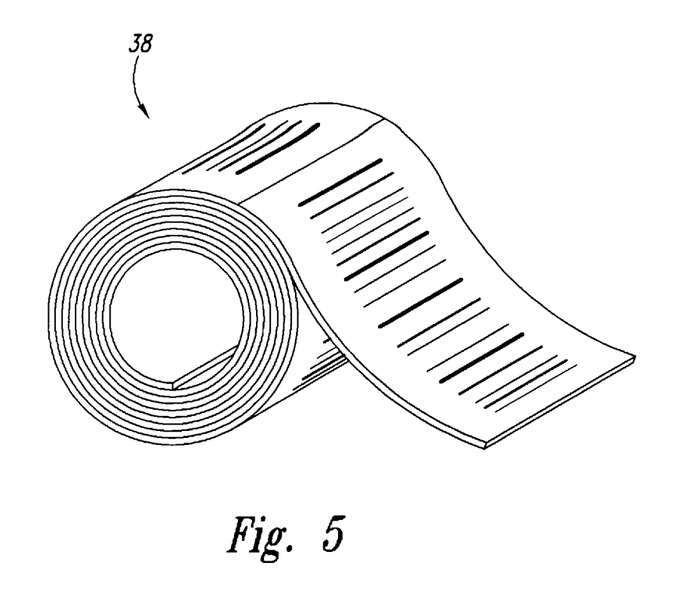
FIG. 5 is an isometric view of a roll of memory devices.

FIG. 3 shows a number of antennas 18 and a number of integrated circuits 20 on the first surface 14 of the substrate 12. Where the substrate 12 takes the form of a continuous web of material, multiple RF tags 10 may be formed along the length thereof. For example, FIG. 4 shows a number of die cut RF tags 10. Die cutting forms perforations, tear lines 36, or similar structures through the layers of the RF tags 10 to define individual RF tags 10. This allows individual RF tags 10 to be easily separated from a roll 38 of RF tags 10 as shown in FIG. 5.

Each of the RF tags 10 includes an indicia in the form of a machine-readable symbol 34 printed on a surface of the face sheet 32. The machine-readable symbol 34 may encode data relating to the particular RF tag 10, a group of RF tags 10, or an item or container 40 (FIGS. 6 and 7) to which the RF tag 10 is fixed. Such encoding techniques are generally taught in the commonly assigned U.S. patent application Ser. No. 09/164,203, filed Sep. 30, 1998, and entitled "Memory Tag and Method of Manufacture".

FIGS. 6 and 7 show the RF tag 10 secured to an item or package 40. The indicia 34 on the memory tag 10 is visually discernible when the RF tag 10 is in use, properly mounted to the item or container 40. One skilled in the art will note the rather pronounced profile of the RF tag 10 as shown in FIG. 7. The RF tag 10 shown in FIG. 7 is in an uncompressed or expanded state so as to space the antenna 18 (FIG. 1) relatively away from the item or container 40.

The intermediate layer 22 may provide any of a number of benefits. For example, one side of the intermediate layer 22 may conform to the integrated circuit 20 and antenna 18, while the other side provides a substantially flat, smooth surface 26 for printing or receiving the face sheet 32. The substantially flat surface 26 may provide the base for other manufacturing operations such as depositing the adhesive layer 28. Where the intermediate layer 22 is compressible, the RF tag 10 may selectively have a low profile at one time and a relatively high profile at another time. The low profile advantageously permits the RF memory tag 10 to be fed through a printer or similar device. The high profile advantageously spaces the antenna 18 from the adhesive layer 28 and the item or container 40 carrying the RF tag 10 to improve communications with the RF tag 10.

Figure 8:
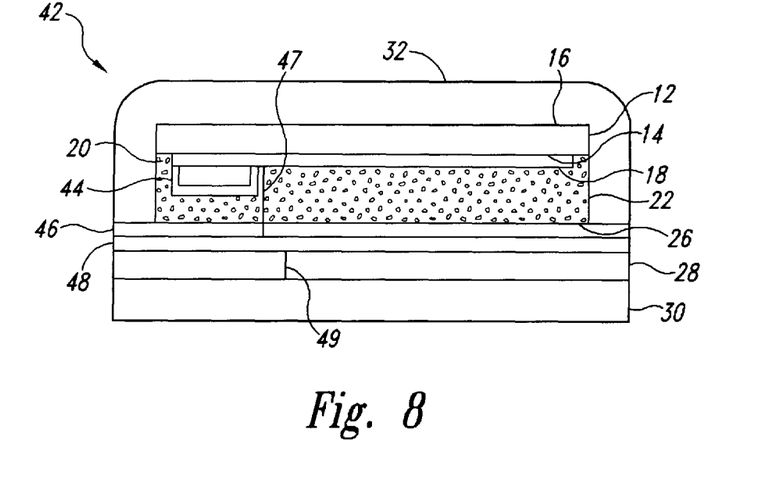
FIG. 8 is a cross-sectional view of an alternative embodiment of the memory device of FIG. 1.

An alternative RF tag 42 is shown in FIG. 8. This alternative embodiment, and those described herein, are substantially similar to the previously described embodiment, and common elements are identified by the same reference numbers. Only the significant differences are described in detail.

The RF tag 42 includes an encapsulation 44 surrounding at least a portion of the integrated circuit 20. Encapsulating integrated circuits to provide mechanical, thermal, and, or electrical protection to the integrated circuit is well known in the art and will therefore not be discussed in detail.

The RF tag 42 may include a film layer 46 positioned between the substantially planar surface 26 of the intermediate layer 22 and the adhesive layer 28. The film layer 46 provides an environmentally protective barrier for the intermediate layer 22 and the electronics. The face sheet 32 may extend over an edge of the substrate 12 to form a protective enclosure around the substrate 12, the antenna 18, and the integrated circuit 20. The face sheet 32 may terminate adjacent the film layer 46 to form an enclosure completely surrounding the antenna 18 and integrated circuit 20. The face sheet 32 may be joined to the film layer 46 to form a sealed enclosure.

The RF tag 42 may further include a conductive grounding plane 48 positioned between the antenna 18 and the adhesive layer 28. The grounding plane 48 may comprise a metal foil layer electrically isolated from the antenna 18. Depending on the frequency of transmissions and the physical dimensions, the grounding plane 48 may be spaced from the antenna to serve as a shield. Proper spacing of the grounding plane 48 from the antenna 18 eliminates interference with the antenna 18 from the item or container 40 to which the RF tag 42 is adhered, thereby enhancing the transmission and reception of the antenna 18 in some situations.

The grounding plane 48 may also be spaced from the antenna 18 to achieve a capacitive coupling therebetween, such that the antenna 18 and grounding plane 48 form a dipole over ground, thereby significantly enhancing the range of the antenna 18. The spacing between the antenna 18 and grounding plane 48 may be controlled by the careful selection and dimensioning of materials, such as the intermediate layer 22.

A lead 47 may electrically couple the grounding plane 48 to a signal ground on the integrated circuit 20. The voltage on the signal ground may be varied to control the voltage difference between the grounding plane 48 and the antenna 18 to, for example, tune the antenna 18.

Alternatively, the grounding plane 48 may include an optional finger or plug 49 (FIG. 9), extending through the adhesive layer 28 to electrically couple the grounding plane 48 with a conductive surface of an item or container 40 when the RF tag 10 is mounted.

Figure 9:
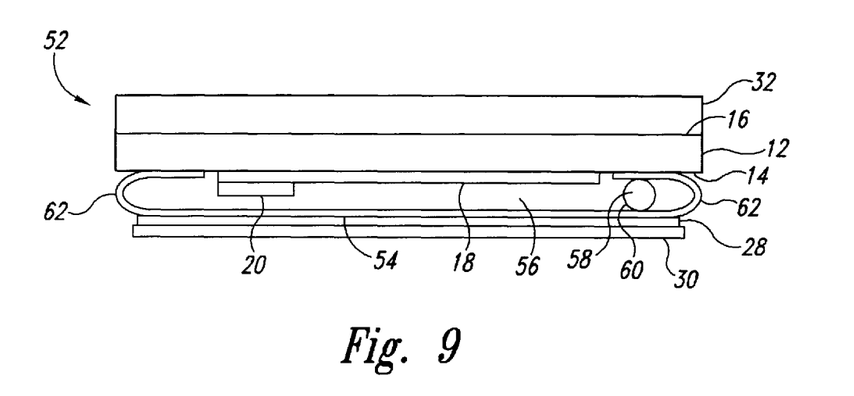
FIG. 9 is a cross-sectional view of a second embodiment of the memory device including an envelope, the memory device in a compressed state.

A second embodiment of an RF tag 52 is shown in a compressed state in FIG. 9. The RF tag 52 includes an envelope 54. The envelope may contain a first material 56 for reacting with a second material 58. The second material 58 may be contained in a crushable container such as a vial 60. The first material 56 may be water while the second material 58 may be sodium bicarbonate, the mixing of which will produce carbon dioxide. When the RF tag 52 passes between a pair of rollers during, for example, a printing operation, the vial 60 is crushed (FIG. 10), allowing the two materials 56, 58 to mix. The materials 56, 58 are selected to produce a controlled reaction resulting in an increase in pressure within the envelope 54.

Figure 10:
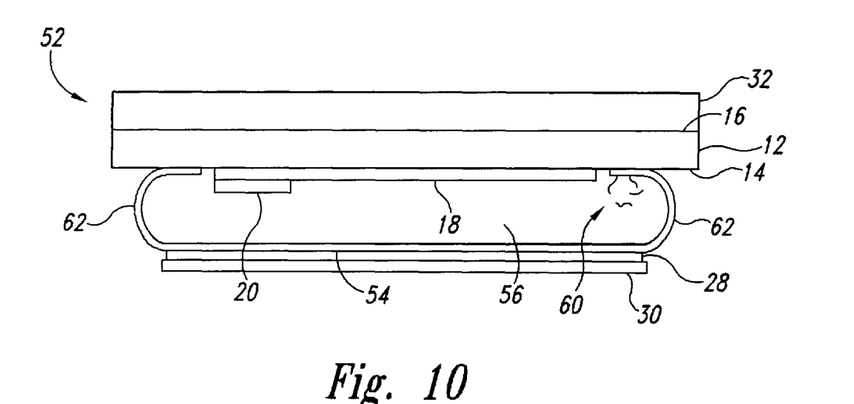
FIG. 10 is a cross-sectional view of the memory device of FIG. 9 in an expanded state.

As shown in FIG. 10, the envelope 54 expands in response to the increase in pressure within the envelope 54. The envelope 54 may permit expansion by changing the radius of curvature of an elbow or meniscus 62 formed around a periphery of the envelope 54. Alternatively, or additionally, the envelope 54 may permit expansion due to the selection of a complaint material for the envelope 54. One skilled in the art will note that the expansion of the envelope 54 spaces the antenna 18 from the adhesive 28, and consequently away from a container or item to which the RF tag 52 is attached. One skilled in the art will recognize that other methods for increasing the pressure within the envelope 54 may be suitable to space the antenna 18 from the adhesive 28. One such method employs an inlet valve (not shown) to selectively allow a fluid, such as air, to be transferred into the envelope 54. The ways of increasing pressure within the envelope 54 are numerous and well known and will therefore not be discussed in further detail.

Figure 11:
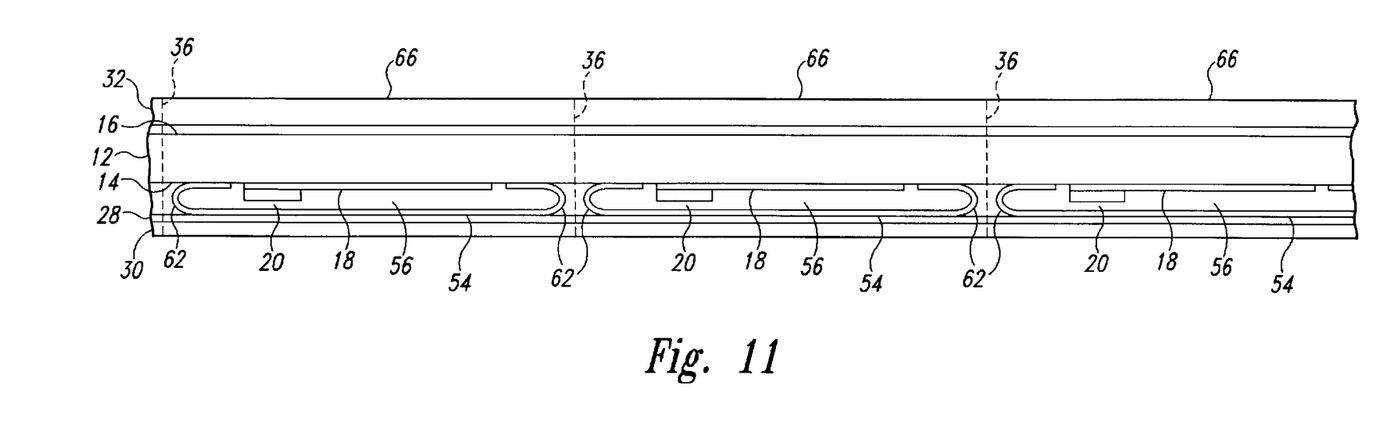
FIG. 11 is a cross-sectional view of a number of memory devices formed on a continuous web, the memory devices held in a compressed state by tension of an adhesive.

FIG. 11 shows a number of die-cut RF tags 66 including respective envelopes 54, carried on a continuous substrate 12. The envelopes 54 contain a fluid 56 under pressure, such as air at a pressure greater than one atmosphere. The tension of the adhesive 28 retains the RF tags 66 and the respective envelopes 54 in a compressed state. Removing one of the RF tags 66 releases the tension provided by the neighboring RF tags, permitting the removed RF tag 66 to expand. Thus, the RF tags 66 will expand when removed for use by the end user.

Figure 18:
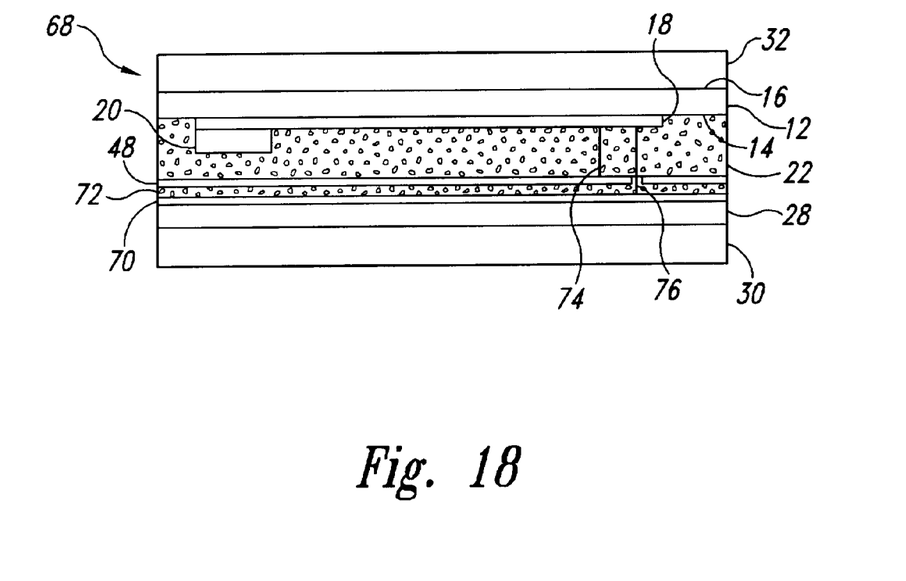
FIG. 18 is a cross-sectional view of a memory device including a pair of conductive ground planes separated by a dielectric to form a capacitor.

FIG. 18 shows a third exemplary embodiment of an RF tag 68, that includes a first ground plane 48 separated from a second ground plane 70 by a layer of dielectric material 72. The ground planes 48, 70 and dielectric material 72 form a capacitive structure that may store energy derived, for example, from an RF interrogation signal. Leads 74, 76 may electrically couple the ground planes 48, 70, respectively. The dielectric material 72 may be the same material as the intermediate layer 22. Alternatively, the dielectric material 72 may be a different material, and may be relatively incompressible in comparison to the intermediate layer 22.

Figure 12:
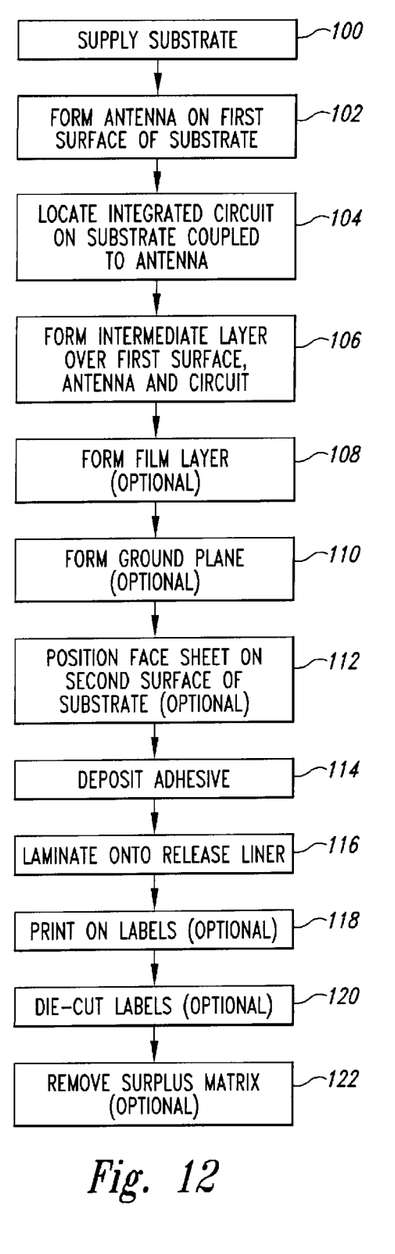
FIG. 12 is a flowchart showing a first exemplary method of creating the memory device of FIGS. 1, 2 and 8.

FIG. 12 shows an exemplary method of forming memory devices such as the RF tag 10 (FIGS. 1, 2 and 8). In step 100, the substrate 12 of a low conductivity material provides the base for forming the RF tag 10.

An antenna 18 is formed on the first surface 14 of the substrate 12 in step 102. Forming the antenna 18 may include depositing a layer of suitably conductive material, such as aluminum, on the first surface 14 of the substrate 12. Forming the antenna 20 may also include etching the conductive layer so as to define conductive traces that serve as the antenna 20 and as mounting pads and electrical connections (not shown) as is commonly known in the art. Alternative methods of forming the antenna 18 may include, for example, printing conductive circuits or traces on the first surface 14 of the substrate 12. Suitable methods for forming conductive elements and electronics for radio frequency tags are disclosed in the commonly assigned U.S. patent application Ser. No. 09/082,427, filed May 20, 1998, entitled "Method and Apparatus for Making Electrical Traces, Circuits and Devices".

In step 104, pick-and-place machinery may mount the integrated circuit 20 to the first surface 14 of the substrate 12. The integrated circuit 20 may have leads (not shown) for coupling the integrated circuit 20 to the antenna 18. A variety of methods for mounting integrated circuits 20 is generally known in the art and will therefore not be described in detail. As discussed above, the integrated circuit 20 may contain memory, logic and power circuitry as is also conventionally known it the art. A method for coupling integrated circuits to antennas in RF tags is disclosed in the commonly assigned U.S. patent application Ser. No. 09/164,203, filed Sep. 30, 1998, entitled "Memory Tag and Method of Manufacture" and U.S. patent application Ser. No. 09/169,200, filed Sep. 30, 1998, entitled "Chip Placement On Smart Label".

In step 106, the intermediate layer 22 is formed over the first surface 14 of the substrate 12, the antenna 18 and the integrated circuit 20. The intermediate layer 22 conforms to the shape of the first surface 14, the antenna 18, and the integrated circuit 20, providing the substantially planar surface 26 opposed to the first surface 14 of the substrate 12. The intermediate layer 22 may be thermally and electrically insulating to provide mechanical, thermal and electrical protection to the integrated circuit 20. The intermediate layer 22 may also be selectively deformable such that the distance 24, 24' between the antenna 18 and the adhesive layer 28 (FIGS. 1 and 2) may be selectively adjusted.

In optional step 108, and as shown in FIG. 8, forming the RF tag 10, 42 may include depositing a film layer 46 over the substantially planar surface 26 of the intermediate layer 22. The film layer 46 may, for example, comprise a film of waterproof material.

Manufacturing the RF tag 10, 42 may also optionally include forming the ground plane 48 between the antenna 18 and the adhesive 28 as shown in step 110. The ground plane 48 may take the form of a thin layer of metal foil deposited over the optional film layer 46 or over the substantially planar surface 26 of the intermediate layer 22. An alternative method of forming the ground plane is discussed below with reference to FIGS. 16 and 17.

The various layers may be dimensioned to achieve a pre-defined spacing between the ground plane 48 and the antenna 18, between the ground plane 48 and the item or container 40, and between the antenna 18 and the item or container 40.

In step 112, a face sheet 32 is positioned on the second surface 16 of the substrate 12. The face sheet 32 provides a substantially smooth and uniform surface to permit high quality printing thereon. Where electrical traces (not shown) are formed on the second surface 16 of the substrate 12, a second intermediate layer (not shown) may be disposed between the second surface 16 and the face sheet 32 to compensate for any non-uniformities caused by the electrical traces.

In step 114, an adhesive layer 28 is deposited over the first surface 14 of the substrate 12. The adhesive layer 28 may be directly deposited on the substantially planar surface 26 of the intermediate layer 22, or may be deposited on either the film layer 46 or the grounding plane 48.

The resulting structure is laminated onto a release liner 30 (Step 116). A printer may print identifying indicia on the face sheet in optional step 118. The laminated structure may be die-cut to define the perforations or tear lines 36 between adjacent RF memory tags 10 in optional step 120. As discussed above, the release liner 30 provides a selectively removable layer over the adhesive layer 28. Surplus matrix from the die-cutting may be removed in optional step 122.

Figure 13:
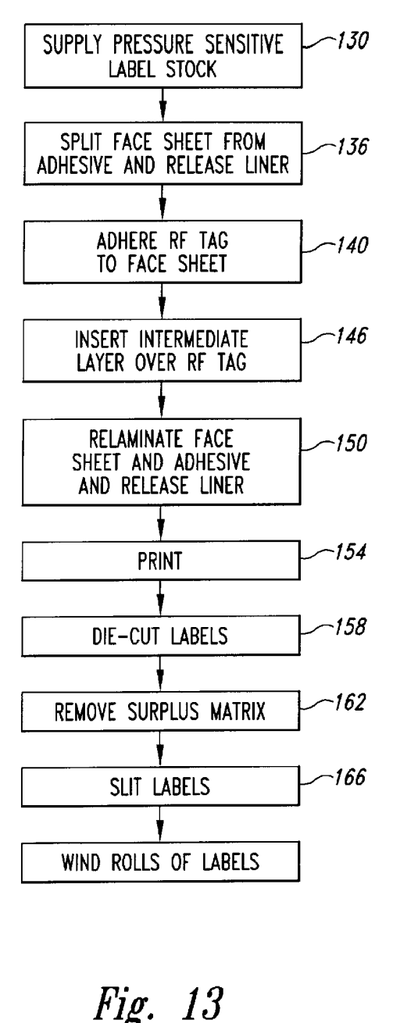
FIG. 13 is a flowchart showing a second exemplary method of creating the memory device of FIGS. 1, 2 and 8.
Figure 14:
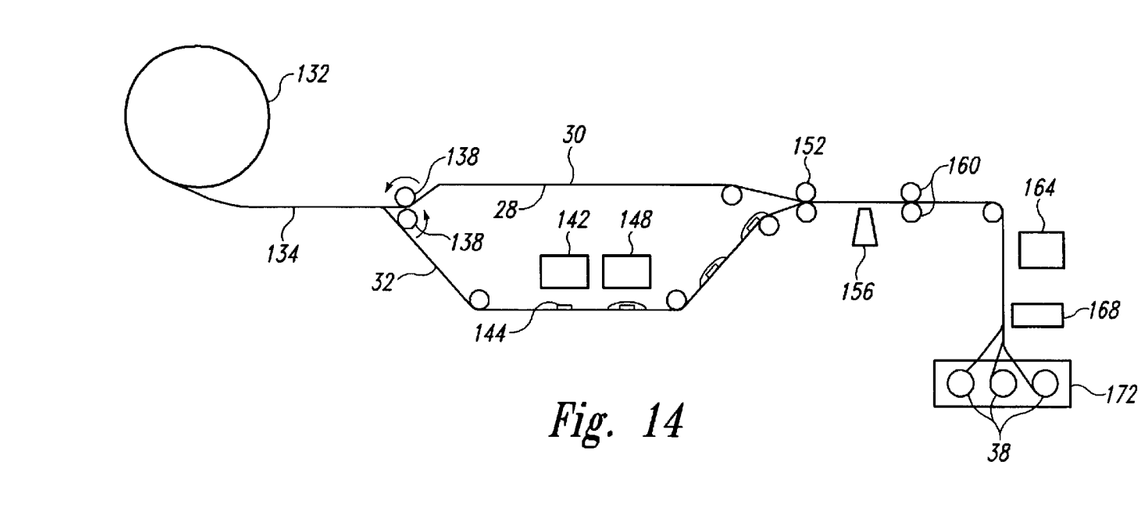
FIG. 14 is a block diagram of an apparatus for forming the RF tags.

An alternative exemplary method of forming memory devices 10 will be discussed with reference to FIGS. 13 and 14. In step 130, a reel 132 of pressure sensitive label stock 134 supplies a continuous web of face sheet 32 laminated to a release liner 30 that carriers a pressure sensitive adhesive layer 28. Such label stock is generally commercially available. The label stock 134 may include a silicone coating (not shown) to control adhesion. The silicone coating may have a low peel release additive (not shown) on the release liner side of the adhesive layer 28 and a medium peel release additive (not shown) on the face sheet side to encourage the release liner 30 to separate from the adhesive 28 rather than from the face sheet 32.

In step 136, a pair of rollers 138 driven in opposite directions cause the face sheet 32 to split from the adhesive layer 28 and release liner 30. In step 140, pick-and-place machinery 142 adheres a pre-formed RF tag 144 including an antenna 18 and integrated circuit 20 may be adhered to the inner surface of the face sheet 32. The RF tag 144 may carry an adhesive, or an adhesive may be applied to the face sheet 32, for example by spraying.

In step 146, automated machinery 148 may adhere the intermediate layer 22 over each of the RF tags 144. The intermediate layer 22 may carry adhesive or an adhesive may be applied to the RF tag. In step 150, rollers 152 then relaminate the face sheet 32 to the release liner 30 and the pressure sensitive adhesive layer 28.

In step 154, a print head 156 may then print on the face sheet 32. In step 158, a set of dies 160 die-cut the resulting laminate structure to define memory devices 10 on the release liner 30. In step 162, any surplus from the die-cut operation may be removed, for example by a vacuum device 164. In step 166, cutters 168 may slit the resulting structure to form a number of individual webs of memory devices 10. In step 170, a turret winder 172 may be used to continuously wind the individual webs into rolls 38 without interrupting the overall process.

Figure 15:
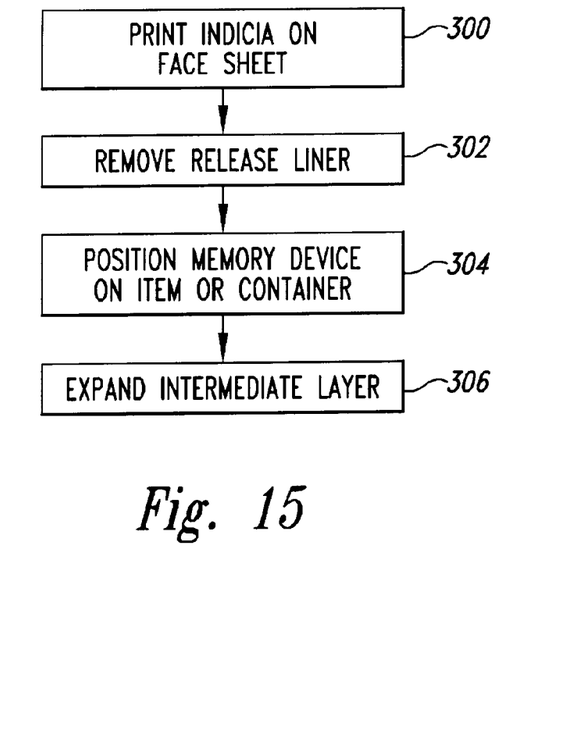
FIG. 15 is a flowchart showing an exemplary method of using the memory device.

FIG. 15 shows an exemplary method of using a memory device such as the RF tag 10. In step 300, and as shown in FIG. 4, printing or etching of indicia may be occur on the face sheet 32. The user removes the release liner 30 in step 302 to expose the pressure sensitive adhesive layer 28. In step 304, and as shown in FIGS. 6 and 7, the user positions the RF tag 10 on an item or container 40. In step 306, the user expands the intermediate layer 22 of the RF tag 10 to space the antenna 18 away from the adhesive layer 28, thereby spacing the antenna 18 away from the item or container 40.

Where the antennas, conductive circuits, or traces are formed on the first surface 14 by printing, as in accordance with the teachings of U.S. patent application Ser. No. 09/082,427, filed May 20, 1998, entitled "Method and Apparatus for Making Electrical Traces, Circuits and Devices", the spent ribbon may be used in forming the ground plane 48, thereby eliminating waste and reducing costs.

Figure 16:
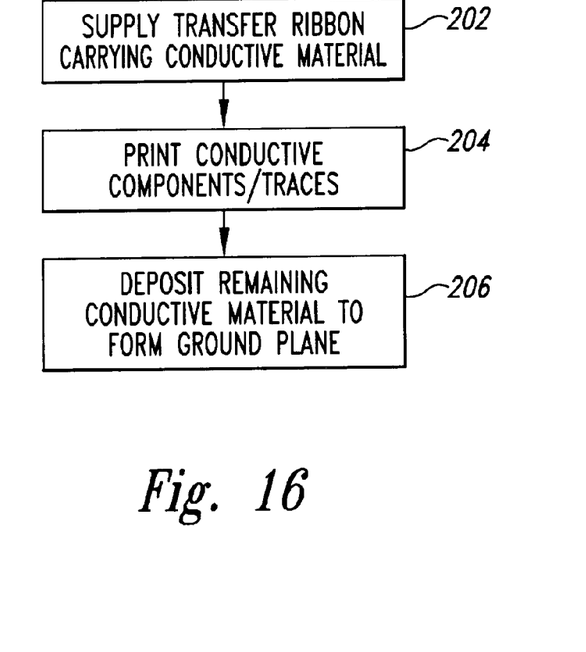
FIG. 16 is a flowchart showing a first exemplary method of forming a ground plane.
Figure 17:
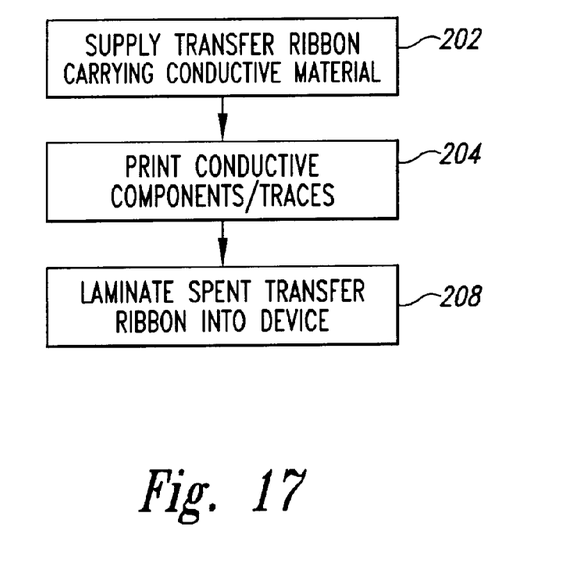
FIG. 17 is a flowchart showing a second exemplary method of forming a ground plane.

For example with reference to FIG. 16, a transfer ribbon carrying conductive material may be supplied, (Step 202) for printing conductive components and traces (Step 204) in accordance with the teachings of U.S. patent application Ser. No. 09/082,427. In step 206, a thermal plate roller may transfer all remaining metal on the spent ribbon to the RF tag 10, 42 to serve as the ground plane 48. Alternatively, as shown in FIG. 17, in step 208, the spent polyester ribbon may be laminated into the RF tag 10, 42, the metal remaining on the spent ribbon serving as the ground plane 48. One skilled in the art will note that when formed by the above methods, the ground plane will be the negative image of the conductive traces printed on the first surface 14 of the substrate 12.

The following co-pending and commonly assigned U.S. patent applications are incorporated herein by reference: U.S. Ser. No. 09/082,427, filed May 20, 1998, entitled "Method and Apparatus for Making Electrical Traces, Circuits and Devices"; U.S. Ser. No. 09/164,203, filed Sep. 30, 1998, entitled "Memory Tag and Method of Manufacture"; U.S. Ser. No. 09/173,137, filed Oct. 15, 1998, entitled "RF Tag Having Strain Relived Stiff Substrate and Hydrostatic Protection For A Chip Mounted Thereto"; and U.S. Ser. No. 09/164,200, filed Sep. 30, 1998, entitled "Chip Placement On Smart Label".

Although specific embodiments of the invention, and examples for the present invention are described herein for illustrative purposes, various equivalent modifications can be made without departing from the spirit and the scope of the invention, as will be recognized by those skilled in the relevant art. The teachings provided herein of the present invention can be applied to other forms of memory devices not necessarily the exemplary RF tag generally described above. The memory devices may employ indicia other than machine-readable symbols to encode data therein, for example, magnetic tags. The memory devices may employ adhesives other than pressure sensitive adhesives, and in some embodiments, may completely omit adhesives. Similarly, some embodiments of the memory device may omit release liners. The memory devices may further be configured to communicate at frequencies other than the radio frequency range of the electromagnetic spectrum.

These and other changes can be made to the invention in light of the above detailed description. In general, in the following claims, the terms used should not be construed to limit the invention to the specific embodiments disclosed in the specification and the claims, but should be construed to include all memory devices and methods of manufacturing memory devices that operate in accordance with the claims. Accordingly, the invention is not limited by the disclosure, but instead its scope is to be determined entirely by the following claims.

We claim:

1. A wireless memory device, comprising:

a substrate;

an antenna carried on the substrate; and an adhesive layer coupled to the substrate for movement with respect thereto between a first position proximate the substrate and a second position spaced from the substrate with respect to the first position while coupled to the substrate.

2. The wireless memory device of claim 1, further comprising:

a resiliently compressible intermediate layer positioned between the substrate and the adhesive layer to movably couple the adhesive layer to the substrate.

3. The wireless memory device of claim 1, further comprising:
a slow recovery foam layer positioned between the substrate and the adhesive layer to movably couple the adhesive layer to the substrate.

4. The wireless memory device of claim 1, further comprising:
a circuit structure carried by the substrate; and
a slow recovery foam layer positioned between the substrate and the adhesive layer to movably couple the adhesive layer to the substrate, a portion of the foam layer conformingly contacting at least a portion of the circuit structure.

5. The wireless memory device of claim 1, further comprising:
a circuit structure carried by the substrate; and
a slow recovery foam layer positioned between the substrate and the adhesive layer to movably couple the adhesive layer to the substrate, the foam layer having a first side conforming to a shape of the circuit structure and a second side being substantially planar.

6. The wireless memory device of claim 1, further comprising:
a circuit structure carried on a first surface of the substrate; and
a slow recovery foam layer positioned between a second surface of the substrate and the adhesive layer to movably couple the adhesive layer to the substrate.

7. The wireless memory device of claim 1, further comprising:
a resilient compression layer movably coupling the substrate and the adhesive layer.

8. The wireless memory device of claim 1, further comprising:
a slow recovery foam layer movably coupling the substrate and the adhesive layer.

9. The wireless memory device of claim 1, further comprising:
a circuit structure carried by the substrate; and
a slow recovery foam layer movably coupling the substrate and the adhesive layer, a portion of the foam layer conformingly contacting at least a portion of the circuit structure.

10. The wireless memory device of claim 1, further comprising:
a deformable envelope movably coupling the substrate and the adhesive layer.

11. The wireless memory device of claim 1, further comprising:
a selectively pressurizable envelope movably coupling the substrate and the adhesive layer.

12. The memory device of claim 1, further comprising:
a deformable intermediate layer movably coupling the adhesive layer and the substrate; and
a ground plane of a conductive material positioned between the adhesive layer and the intermediate layer.

13. The memory device of claim 1, further comprising:
a deformable intermediate layer movably coupling the adhesive layer and the substrate;
a first ground plane of a conductive material positioned between the adhesive layer and the intermediate layer;
a second ground plane of a conductive material positioned between the adhesive layer and the intermediate layer; and
a dielectric layer positioned between the first ground plane and the second ground plane to form a capacitor.

14. The memory device of claim 1, further comprising:
a deformable intermediate layer movably coupling the adhesive layer and the substrate;
a ground layer positioned between the adhesive layer and the intermediate layer; and
an electrical connection extending from the ground layer through the adhesive layer.

15. The memory device of claim 1, further comprising:
a circuit structure carried by the substrate;
a deformable intermediate layer movably coupling the adhesive layer and the substrate;
a ground layer positioned between the adhesive layer and the intermediate layer; and
an electrical connection extending from the ground layer and the circuit structure to control the voltage of the ground layer.

16. The memory device of claim 1, further comprising:
a deformable intermediate layer movably coupling the adhesive layer and the substrate; and
a film layer disposed between the adhesive layer and the intermediate layer.

17. A wireless memory device, comprising:
an antenna;
a memory coupled to the antenna; and
an adhesive layer coupled to the antenna for movement with respect thereto between a first position proximate the antenna and a second position spaced from the antenna with respect to the first position while coupled to the antenna.

18. The wireless memory device of claim 17, further comprising:
a resilient compression layer movably coupling the adhesive layer to the antenna.

19. The wireless memory device of claim 17, further comprising:
a slow recovery foam layer movably coupling the adhesive layer to the antenna.

20. The wireless memory device of claim 17, further comprising:
a deformable envelope movably coupling the adhesive layer to the antenna.

21. The wireless memory device of claim 17, further comprising:
a selectively pressurizable envelope movably coupling the adhesive layer to the antenna.

22. The wireless memory device of claim 17, further comprising:
a deformable envelope movably coupling the antenna and the adhesive layer, the envelope containing a first material therein, the first material selectively actuable to produce a change in pressure in the envelope to selectively space the antenna with respect to the adhesive layer.

23. The wireless memory device of claim 17, further comprising:
a deformable envelope movably coupling the antenna and the adhesive layer, the envelope containing a first material therein; and
a second material selectively introducable into the first material to chemically react with the first material to produce a change in pressure within the envelope to selectively space the antenna with respect to the adhesive layer.

24. The wireless memory device of claim 17, further comprising:
- a deformable envelope movably coupling the antenna and the adhesive layer, the envelope containing a first material therein; and
- a breakable vial in the envelope containing a second material to chemically react with the first material to produce a change in pressure within the envelope to selectively space the antenna with respect to the adhesive layer.

25. The wireless memory device of claim 17, further comprising:
- a deformable envelope movably coupling the antenna and the adhesive layer, the envelope containing a first material therein selectively actuable to produce a change in pressure within the envelope to selectively space the antenna with respect to the adhesive layer, wherein the first material is selectively triggerable by electromagnetic radiation to produce a change in relative pressure within the envelope.

26. The wireless memory device of claim 17, further comprising:
- a deformable envelope movably coupling the antenna and the adhesive layer, the envelope including a valve to control a pressure within the envelope.

27. The wireless memory device of claim 17, further comprising:
- a deformable envelope movably coupling the antenna and the adhesive layer, wherein the envelope includes a meniscus having a radius of curvature that varies in relation to a pressure within the envelope.

28. The wireless memory device of claim 17, further comprising:
- a deformable envelope movably coupling the antenna and the adhesive layer, wherein the envelope is formed from an elastomeric material.

29. An article of manufacture, comprising:
- a continuous web substrate having opposing first and second surfaces;
- a plurality of antennas formed on the first surface of the substrate;
- a plurality of integrated circuits carried by the web, each of the integrated circuits coupled to a respective one of the antennas; and
- a spacing layer of resiliently compressible material movably coupling an adhesive layer to the antennas for movement between a first position where the adhesive layer is proximate the antennas and a second position where the adhesive layer is spaced from the antennas with respect to the first position.

30. The article of claim 29, further comprising:
- a face sheet disposed over a second surface of the substrate; and
- a release liner removably covering the adhesive layer.

31. The article of claim 29, further comprising:
- a metal ground plane disposed between the substrate and the adhesive layer.

32. The article of claim 29, further comprising:
- a non-conducting film layer disposed between the substrate and the adhesive layer.

33. The article of claim 29 wherein
the substrate is laminated onto a release liner and die-cut to form a plurality of memory devices, each memory device including at least one of the antennas and at least one of the integrated circuits.

34. The article of claim 29 wherein the substrate is coiled into a roll and held in tension such that the spacing layer is compressed.

35. The article of claim 29 wherein the spacing layer comprises a slow recovery foam.

* * * * *